(12) United States Patent
Butt et al.

(10) Patent No.: US 10,366,140 B2
(45) Date of Patent: Jul. 30, 2019

(54) METHOD FOR REPLAYING USER ACTIVITY BY REBUILDING A WEBPAGE CAPTURING CONTENT AT EACH WEB EVENT

(71) Applicant: Lead Intelligence, Inc., Ambler, PA (US)

(72) Inventors: Matt Butt, Philadelphia, PA (US); Ian Carpenter, Ambler, PA (US); Alexander Martin, Philadelphia, PA (US); Emanuel I Wald, Laverock, PA (US); Jason Watt, Hatfield, PA (US)

(*) Notice: Subject to any disclaimer, the term of this patent is extended or adjusted under 35 U.S.C. 154(b) by 573 days.

(21) Appl. No.: 14/226,539

(22) Filed: Mar. 26, 2014

(65) Prior Publication Data

US 2015/0278384 A1    Oct. 1, 2015

(51) Int. Cl.
*G06F 17/00* (2019.01)
*G06F 16/958* (2019.01)
*G06F 16/957* (2019.01)
*G06F 17/22* (2006.01)

(52) U.S. Cl.
CPC ........ *G06F 16/972* (2019.01); *G06F 16/9574* (2019.01); *G06F 17/2247* (2013.01)

(58) Field of Classification Search
CPC . G06F 17/2247; G06F 16/972; G06F 16/9574
See application file for complete search history.

(56) References Cited

U.S. PATENT DOCUMENTS

| | | | | |
|---|---|---|---|---|
| 6,490,553 | B2* | 12/2002 | Van Thong | H04N 5/278 348/E5.06 |
| 6,510,461 | B1* | 1/2003 | Nielsen | H04L 12/18 709/223 |
| 2002/0165936 | A1* | 11/2002 | Alston | G06F 17/30893 709/217 |
| 2008/0091725 | A1* | 4/2008 | Hwang | G06F 17/3028 |
| 2010/0095208 | A1* | 4/2010 | White | G06F 17/30905 715/704 |
| 2010/0174993 | A1* | 7/2010 | Pennington | G06F 1/1616 715/738 |
| 2012/0110437 | A1* | 5/2012 | Pan | G06F 17/30902 715/235 |
| 2014/0053061 | A1* | 2/2014 | Chasen | G06F 17/2247 715/234 |

* cited by examiner

*Primary Examiner* — Cesar B Paula
*Assistant Examiner* — Benjamin J Norris
(74) *Attorney, Agent, or Firm* — LeonardPatel PC; Sheetal S. Patel; Michael A. Leonard, II

(57) ABSTRACT

An improved process for recreating a webpage as presented to the visitor is provided. A skeleton of a webpage, including content and images of the webpage, may be captured for each web event. For each web event, the captured skeleton of the webpage, including the content and the image of the captured webpage, may be transmitted to a server, allowing the server to recreate a webpage that was presented to the visitor.

11 Claims, 19 Drawing Sheets

```
{
  "s": {
    "t": "body",
    "c": {
      "1": {
        "t": "div",
        "c": {
          "3": {
            "t": "a",
            "c": {
              "4": {
                "t": "span"
              }
            }
          },
          "5": {
            "t": "a",
            "c": {
              "6": {
                "t": "span"
              }
            }
          },
          "7": {
            "t": "div"
          }
        }
      }
    }
  },
  "18": {
    "t": "div"
  },
  "19": {
    "t": "div",
    "c": {
      "20": {
        "t": "div"
      }
    }
  },
  "21": {
    "t": "div"
  }
}
```

```
"o": {
  "t": "body",
  "s": [1, 2],
  "p": [13, 14, 14],
  "l": [3, 4],
  "f": [5, 6, 7],
  "d": [8, 9, 9],
  "a": 10
},
"1": {
  "t": "div",
  "s": [15, 14],
  "p": [19, 12, 12],
  "l": [16, 4],
  "f": [5, 6, 7],
  "d": [9, 9, 9],
  "a": 10,
  "o": [17, 17],
  "n": [18, 18, 18, 18]
},
"c": {
  "1903px": 1,
  "685px": 2,
  "rgb(105, 100, 95)": 3,
  "rgb(56, 49, 43)": 4,
  "13px": 6,
  "normal": 7,
  "block": 8,
  "none": 9,
  "start": 10,
  "visible": 11,
  "0px": 12,
  "static": 13,
  "auto": 14,
  "900x": 15,
  "rgba(0, 0, 0, 0)": 16,
  "hidden": 17,
  "20px": 18,
  "absolute": 19,
  "100%": 20,
  "rgb(255, 255, 255)": 21,
  "relative": 22,
  "76px": 23,
  "43px": 24,
  "94px": 25,
  "61px": 26
}
```

1915

METHOD FOR REPLAYING USER ACTIVITY BY REBUILDING A WEBPAGE CAPTURING CONTENT AT EACH WEB EVENT

FIELD

The present invention relates to pulling content and, more particularly, to pulling content from another webpage in real-time to recreate the webpage as presented to a visitor.

BACKGROUND

In the lead generation industry, compliance with leads is a major issue. For example, purchasers of leads ("lead buyers") require that generators of leads ("lead generators") comply with certain requirements. For instance, lead buyers may restrict lead generators from using certain types of information that would mislead a visitor (i.e., a user) of the webpage into filling out a form online. Lead buyers may also require that lead generators include certain disclosures on webpages owned by the lead generators. Currently, there is no mechanism that actively monitors a webpage of the lead generator when a visitor is accessing and filling out a form on the webpage.

Furthermore, when a lead buyer is purchasing a lead, the lead buyer may not know certain information about the lead. For example, the lead buyer may not know who created the lead, the origination of the lead, the content of the webpage, etc. This creates uncertainty when purchasing a lead.

Thus, it may be beneficial to actively monitor the webpage to ensure that lead generators are complying with requirements set forth by the lead buyers and to remove any uncertainty regarding the information surrounding the lead.

SUMMARY

Certain embodiments of the present invention may provide solutions to the problems and needs in the art that have not yet been fully identified, appreciated, or solved by current lead monitoring systems. For example, some embodiments of the present invention pertain to capturing and storing, in real time, content of a webpage that was presented to the visitor of the webpage. This allows a server to recreate the same webpage as previously presented to the visitor, and further allows the lead buyer to view each web event or action performed by the visitor.

In one embodiment, an apparatus is provided. The apparatus includes memory including instructions and at least one processor. The instructions, and the at least one processor, are configured to cause the apparatus to capture a skeleton of a webpage, including content and images of the webpage, for each web event. For each web event, the instructions, and the at least one processor, are further configured to cause the apparatus to transmit the captured skeleton of the webpage, including the content and the image of the captured webpage, to a server, allowing the server to recreate a webpage that was presented to the visitor.

In another embodiment, an apparatus is provided. The apparatus includes memory including instructions and at least one processor. The instructions, and the at least one processor, are configured to cause the apparatus to receive a request from a user to recreate an event to be simulated. The memory, with the at least one processor, are further configured to cause the apparatus to transmit to the computing device a visual representation of the web event, allowing the web event to be recreated, simulated, or both, in a web browser of the computing device, and in a timeline continuum.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 18 illustrates a screen shot of captured content from another webpage, according to an embodiment of the present invention.

FIG. 19 illustrates a skeleton of a capture webpage, according to an embodiment of the present invention.

DETAILED DESCRIPTION OF THE EMBODIMENTS

Some embodiments of the present invention are directed to a system, apparatus, and process for capturing content when a visitor of a webpage accesses and/or enters information into the webpage owned and/or operated by a lead generator from his or her device (e.g., the client device). For example, in some embodiments, the content displayed on the webpage is scanned and transmitted to a server. The style, format, etc., of the webpage can also be scanned and transmitted to a server. This allows the server to create a snapshot of the captured content, i.e., recreate the webpage as displayed to the visitor. This can be performed each time a script for capturing the content loads. In other embodiments, the capturing of the content can be performed each time the visitor performs an action, such as filling out information in a fillable form on the webpage, refreshing the webpage, or loading another webpage of the lead generator. Such actions may be referred as a lead event.

Figure 1:
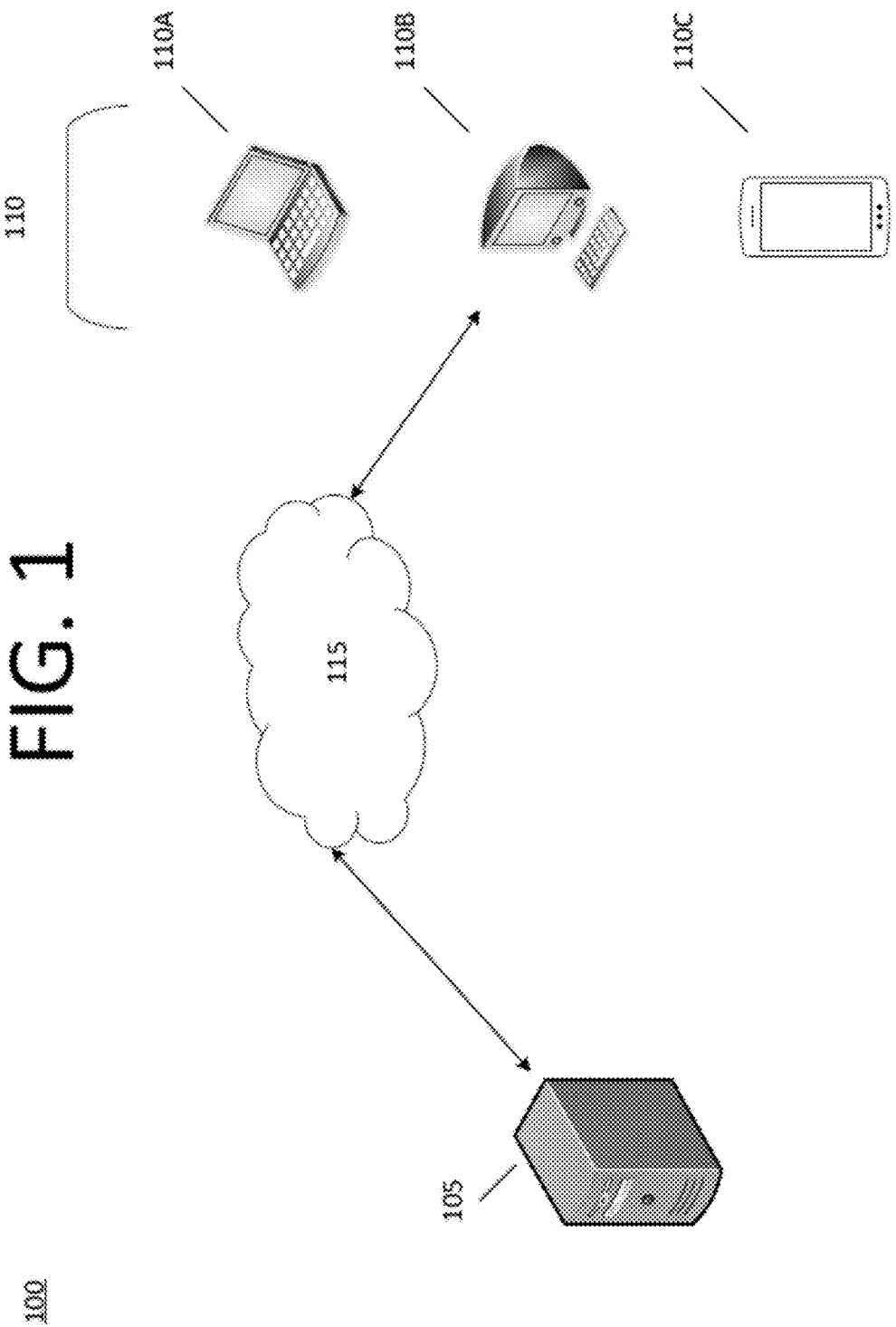
FIG. 1 illustrates a content capturing system, according to an embodiment of the present invention.

FIG. 1 illustrates a content capturing system 100, according to an embodiment of the present invention. Content capturing system 100 includes a lead verification server (hereinafter "server") 105 and client devices 110 that may communicate with each other via a network 115. Client devices 110 may include, but are not limited to, a laptop 110A, a desktop 110B, and a portable computing device 110C, such as a mobile device.

In some embodiment, when a user (or visitor) accesses a webpage via a web browser at any of client devices 110A, 110B, 110C, server 105 receives and stores the webpage as presented to the visitor at each web event (or interaction by the visitor). A web event is defined as the act of a visitor visiting a particular URL or set of URL's within a fixed time period, including all changes made to the URL content as well as all actions taken by the visitor. In other embodiments, server 105 continuously or periodically receives and stores the webpage as presented to the visitor.

It should be appreciated that a webpage executed on client devices 110A, 110B, 110C may include a client-side script that captures the webpage, including the content, style and images, and transmits the captured webpage to server 105. For example, to ensure compliance by lead generators, each webpage owned and/or operated by the lead generators may include the client-side script. In one embodiment, when a visitor accesses a webpage of the lead generator, the client-side script is executed and captures the webpage. In a further embodiment, for each web event, the client-side script is executed and captures the webpage.

Server 105 may include a server-side script that recreates or reconstructs the webpage as presented to the visitor of any of client devices 110A, 110B, 110C. This allows a lead buyer to view the webpage as presented to the visitor, and also ensure that a lead generator is complying with the requirements of the lead buyer when presenting information to the visitor. Content capturing system 100 of FIG. 1 also allows the lead generator to view each action (e.g., web event) performed by the visitor on the webpage via a timeline. See, for example, FIG. 17.

Figure 2:
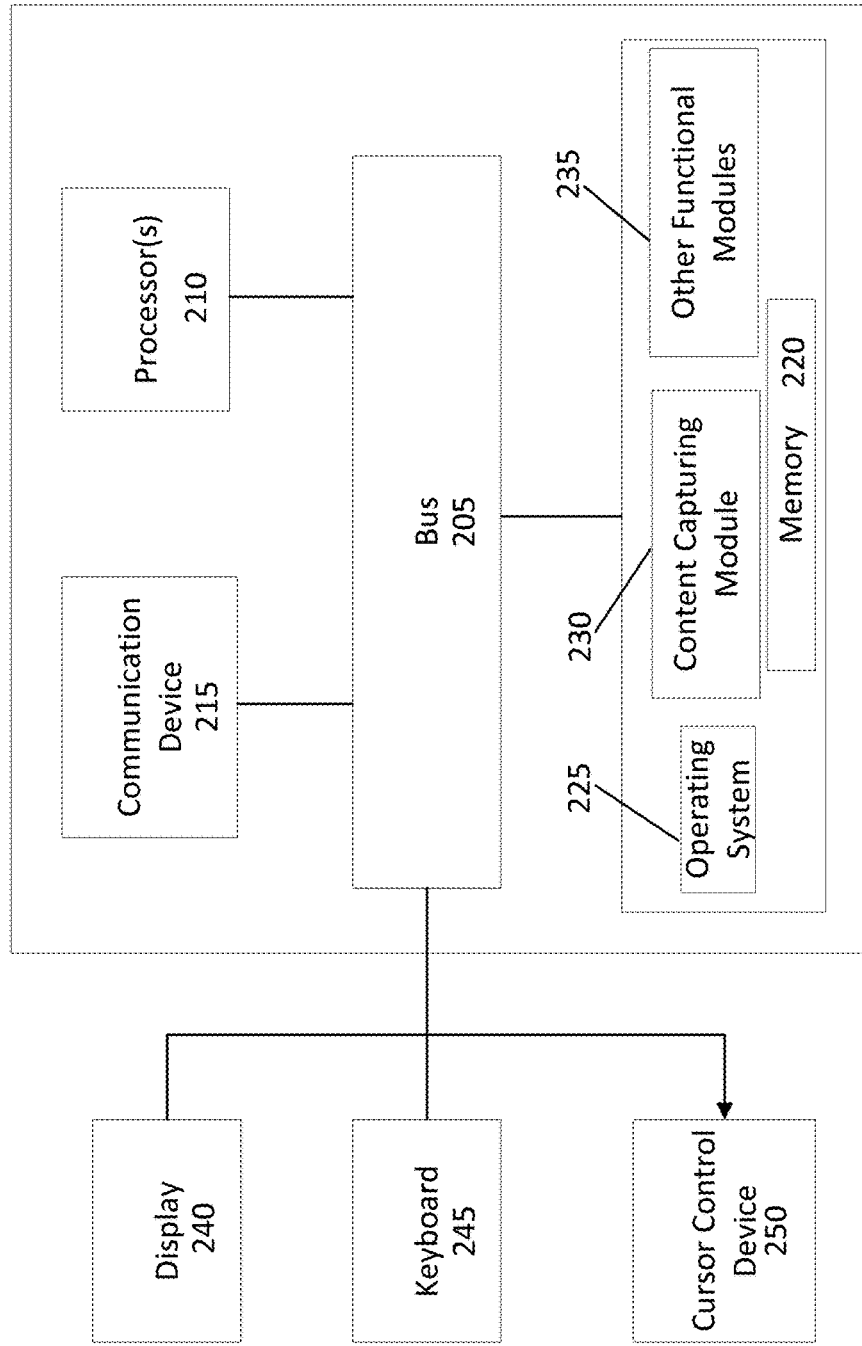
FIG. 2 is a block diagram illustrating a computing system for capturing content, according to an embodiment of the present invention.

FIG. 2 is a block diagram 200 illustrating a computing system for capturing content of a webpage, according to one embodiment of the present invention. Computing system 200 includes a bus 205 or other communication mechanism configured to communicate information, and at least one processor 210, coupled to bus 205, configured to process information. At least one processor 210 can be any type of general or specific purpose processor. Computing system 200 also includes memory 220 configured to store information and instructions to be executed by at least one processor 210. Memory 220 can be comprised of any combination of random access memory ("RAM"), read only memory ("ROM"), static storage such as a magnetic or optical disk, or any other type of computer readable medium. Computing system 200 also includes a communication device 215, such as a network interface card, configured to provide access to a network.

The computer readable medium may be any available media that can be accessed by at least one processor 210. The computer readable medium may include both volatile and nonvolatile medium, removable and non-removable media, and communication media. The communication media may include computer readable instructions, data structures, program modules, or other data and may include any information delivery media.

At least one processor 210 is coupled via bus 205 to a display 240, such as a Liquid Crystal Display ("LCD"). Display 240 may display information to the visitor, such as webpage or recreated webpage. A keyboard 245 and a cursor control unit 250, such as a computer mouse, are also coupled to bus 205 to enable the visitor to interface with computing system 200.

According to some embodiments, memory 220 may store software modules that may provide functionality when executed by at least one processor 210. The modules can include an operating system 225 and a content capture module 230, as well as other functional modules 235. Operating system 225 may provide operating system functionality for computing system 200. Because computing system 200 may be part of a larger system, computing system 200 may include one or more additional functional modules 235 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
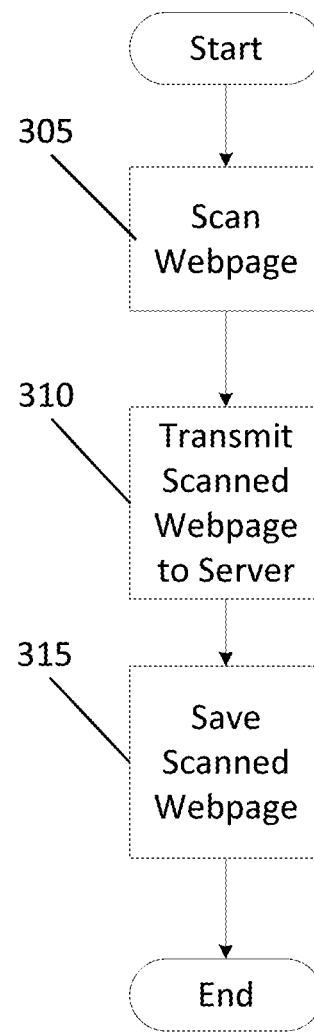
FIG. 3 is a flow diagram illustrating a process for capturing content displayed to a visitor of a webpage, according to an embodiment of the present invention.

FIG. 3 is a flow diagram 300 illustrating a process for capturing content displayed to a visitor of a webpage, according to an embodiment of the present invention. It should be appreciated that in some embodiments, client-side script embedded within a webpage of the lead generator may execute the process of FIG. 3 when a visitor loads the webpage using his or her client device. For example, at 305, when the visitor accesses the webpage, the webpage that is presented to the visitor is scanned. The scanning may include capturing a skeleton of the webpage, content of the webpage, images of the webpage, the layout of the webpage, the format of the webpage, etc.

At 310, the scanned information is transmitted, and save at 315 to a server, such as server 105 of FIG. 1. The process of scanning and transmitting the information related to the webpage may be performed continuously until the visitor leaves the webpage, each time the client side script loads, for each web event (e.g., when visitor is typing, scrolling up and/or down the webpage), etc. This allows the server to recreate the webpage as it was presented to the visitor in a timeline format. See, for example, item 1705 of FIG. 17.

Figure 4:
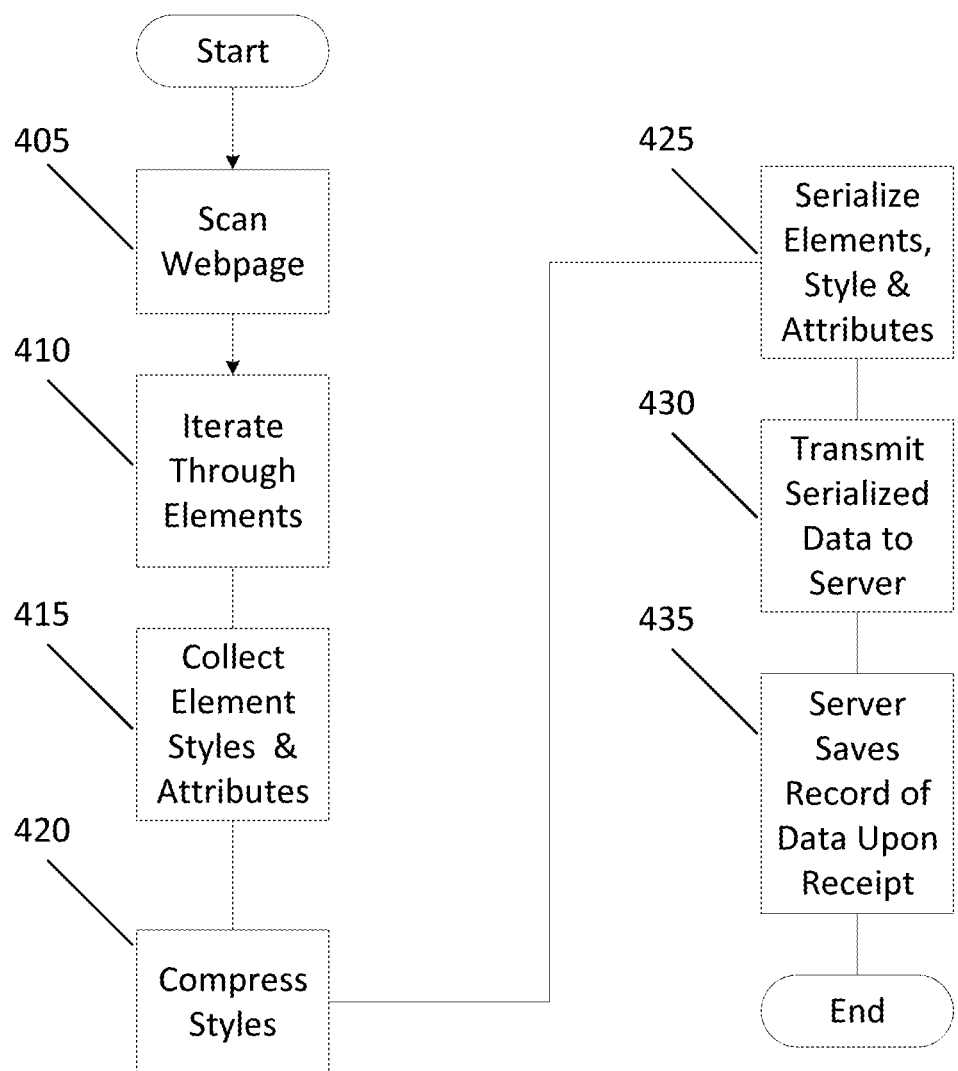
FIG. 4 is a flow diagram illustrating a process for capturing content displayed to a visitor, according to an embodiment of the present invention.

FIG. 4 is a flow diagram illustrating a process for capturing content displayed to a visitor, according to an embodiment of the present invention. It should be appreciated that in some embodiments, client-side script embedded within a webpage of the lead generator may execute the process of FIG. 4 when a visitor of the webpage loads the webpage using his or her client (or computing) device. The process begins at 405 with scanning the webpage when a visitor of the webpage access the webpage. At 410, the process iterates through each element on the webpage. Element may include a style and attribute. At 415, the element styles and element attributes are collected. Style elements may include color, font type, prominence, spacing, padding, layout, alignment, etc. Element attributes may include id, name, type, width, height, etc.

After collecting the element styles and attributes, the elements styles are compressed at 420 and each element style and attribute are serialized at 425. It should be appreciated that element attribute may include any property of the element that affects its aesthetic appearance. For example, an element attribute may be the border thickness, which determine how many pixels thick an element's border is when rendered in a browser. At 430, the serialized data is transmitted to the server allowing the server to save the serialized data at 435. It should be appreciated steps 430 and 435 may be executed by the server, as shown, for example, in FIG. 1.

Figure 5:
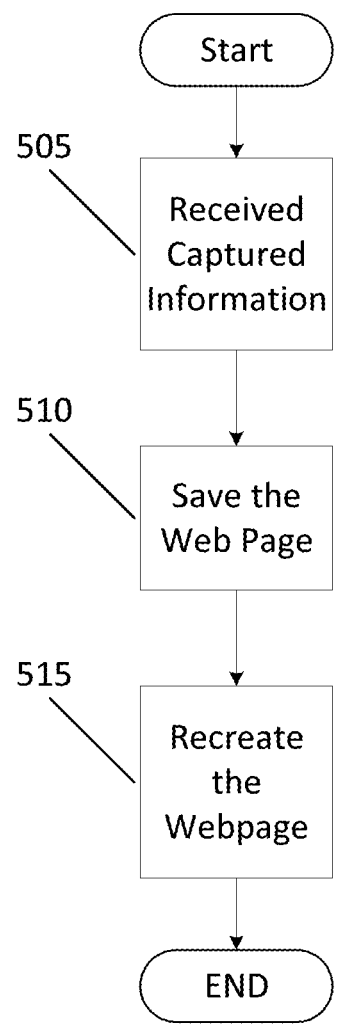
FIG. 5 is a flow diagram illustrating a process for recreating the webpage as presented to the visitor, according to an embodiment of the present invention.

FIG. 5 is a flow diagram 500 illustrating a process for recreating the webpage as it was presented to the visitor, according to an embodiment of the present invention. It should be appreciated that a server-side script stored on server 105 of FIG. 1 may be configured to execute the process of FIG. 5. It should also be appreciated that server 105 of FIG. 1 may include components that are similar to those of computing system 200 of FIG. 2.

The process begins at 505 with the server receiving captured (or scanned) information from the client device, and saving the captured information in a local or remote database at 510. The captured information may be JavaScript™ Object Notation (JSON) encoded (e.g., in an array format). At 515, the captured information (e.g., style elements and the structure of the webpage) is used to recreate the webpage. This recreation process allows a server to playback the actions performed by the visitor on the webpage. See, for example, item 1705 of FIG. 17.

Figure 6:
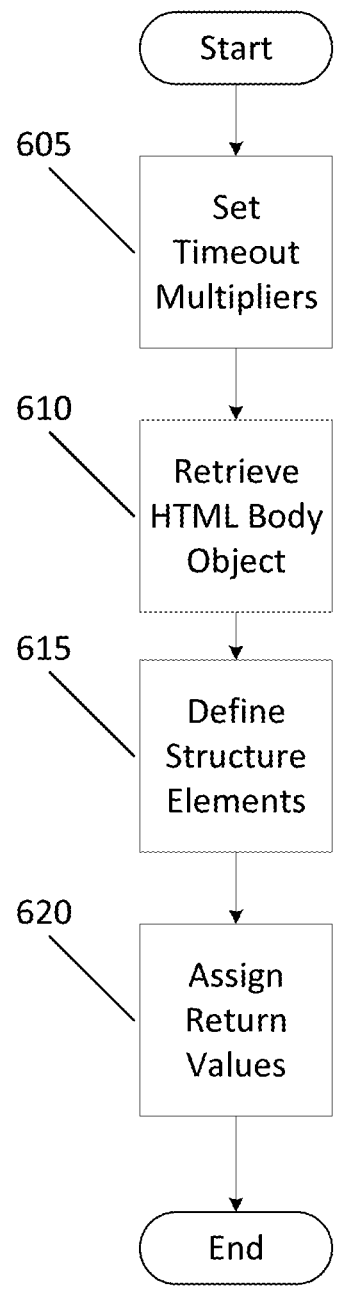
FIG. 6 is a flow diagram illustrating an initialization process, according to an embodiment of the present.

FIG. 6 is a flow diagram 600 illustrating an initialization process, according to an embodiment of the present. It should be appreciated that the client-side script embedded within the webpage of the lead generator can execute the process of FIG. 5. In this embodiment, when the webpage is loaded, the initialization process begins with setting timeout multipliers at 605 depending on the browser (e.g., Internet Explorer®, Firefox®, etc.).

It should be appreciated that certain benefits may be realized when setting timeout multipliers in the browser. For example, by setting timeout multipliers in the browser, the compaction of data can occur seamlessly in the background of the browser. Further, these operations are completely transparent to the visitor of the webpage, thus having no impact on the visitor's experience. Alternative embodiments may be employed to achieve the same result, such as using a background process (or module) to handle the various compaction steps such that it is non-blocking, and therefore, has no adverse impact on the browser and the visitor's experience.

At 610, the HTML body object is retrieved, and, at 615, the structure elements for the HTML body object are set or defined. It should be appreciated that this may be a recursive function in order to set each of the structure elements. The process of setting the structure elements is described in further detail below with respect to FIG. 7. At 620, a return value is set or assigned to the structure. A return value may be a serialized object, such as a JSON structure, which contains references to the various elements on the page, position and associated styles.

Figure 7:
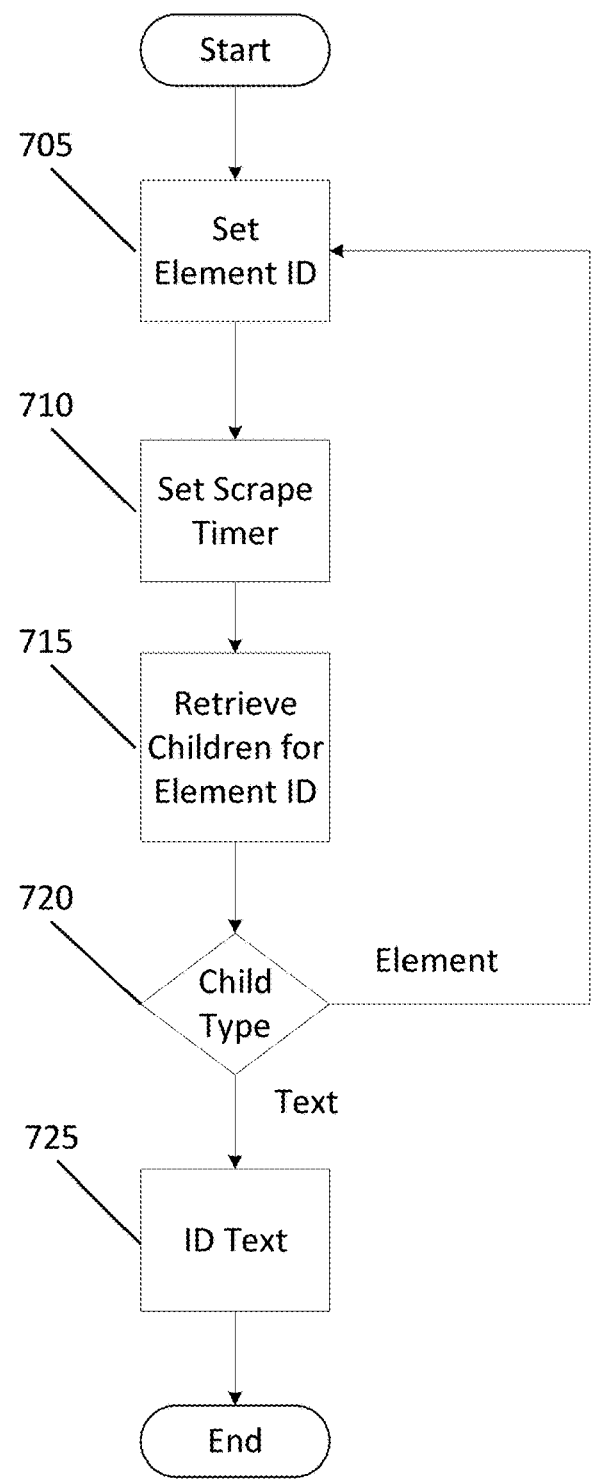
FIG. 7 is a flow diagram illustrating a process of setting the structural elements, according to an embodiment of the present invention.

FIG. 7 is a flow diagram 700 illustrating a process of setting the structure elements, according to an embodiment of the present invention. It should be appreciated that the client-side script embedded within the webpage of the lead generator can execute the process of FIG. 7 in some embodiments. At 705, an element identification (or ID) for the structural element is set, and, at 710, a scrape timer for the element ID is set. A more detailed explanation of setting the scrape timer for the element ID is described below with respect to FIG. 8.

At 715, children for the element ID are retrieved, and, at 720, the child type is determined, i.e., text or element. At 725, if the child type is text, the process identifies the text and sets the ID for the text and places the text into an array. If, however, the child type is an element, the process recurses through the properties of the element, e.g., style elements. This allows the process to obtain the skeleton of the webpage. See, for example, FIG. 19.

Figure 8:
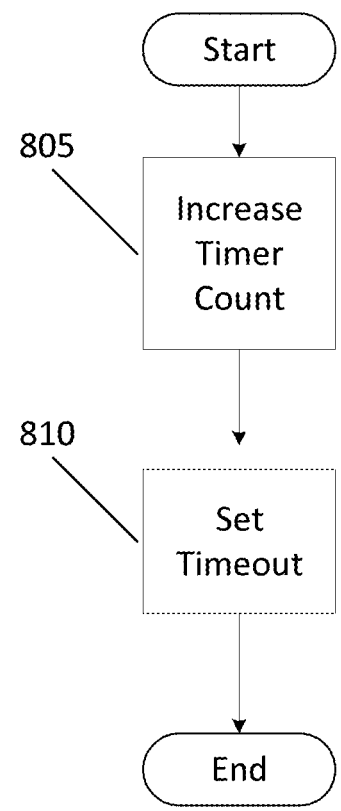
FIG. 8 is a block diagram illustrating a process for setting a scrape timer for a structural element, according to an embodiment of the present invention.

FIG. 8 is a block diagram 800 illustrating a process for setting a scrape timer for a structural element, according to an embodiment of the present invention. It should be appreciated that the client-side script embedded within the webpage of the lead generator may execute the process of FIG. 8 in some embodiments. At 805, a timer counter is increased for each structural element, and, at 810, a timeout is set with timeout multipliers and an offset value. When a timeout occurs, a scrape element function is run to retrieve element attributes.

Figure 9:
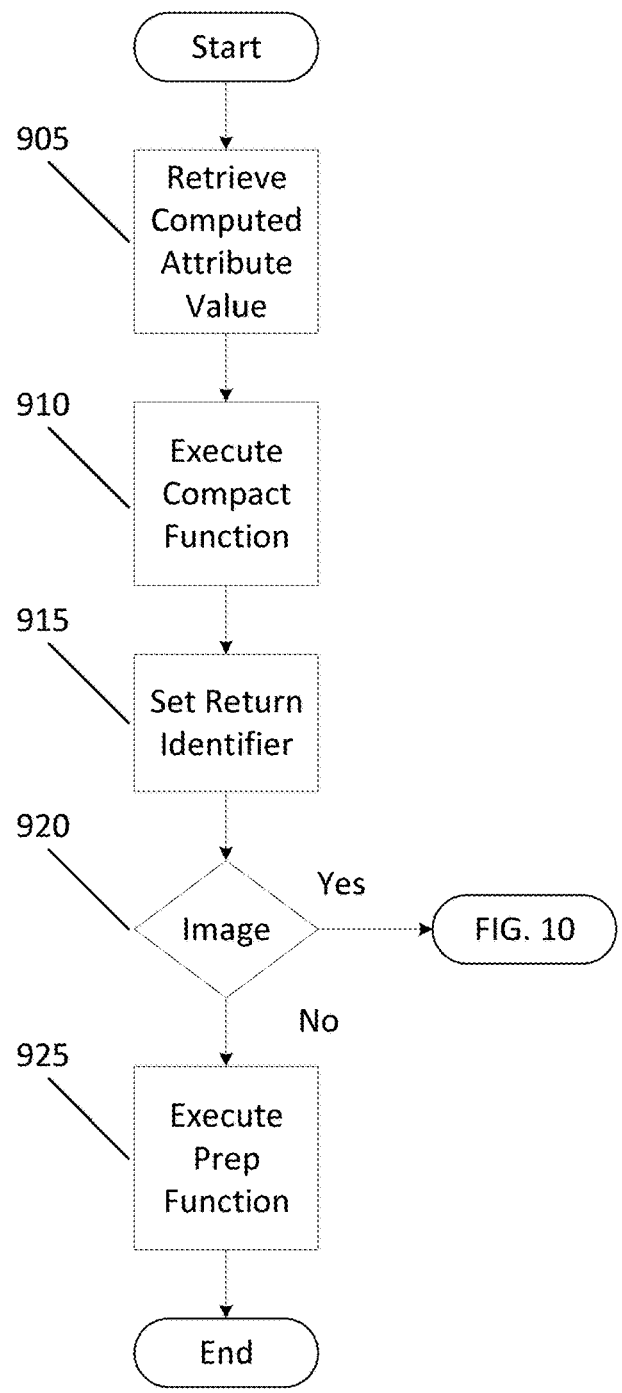
FIG. 9 is a flow diagram illustrating a process for retrieving element attributes, according to an embodiment of the present invention.

FIG. 9 is a flow diagram 900 illustrating a process for retrieving element attributes, according to an embodiment of the present invention. In this embodiment, an element attribute refers to any property of the element that affects its aesthetic appearance. It should be appreciated that the client-side script embedded within the webpage of the lead generator may execute the process of FIG. 9 in some embodiments. At 905, a computed attribute value is retrieved for each element attribute, and, at 910, a compact function is executed to determine an identifier for the attribute value. For instance, the compact function determines whether the attribute value is in an array. If the attribute value is not in the array, the compact function sets a new identifier for the attribute value and returns the new identifier for the attribute value. If however, the attribute value is in the array, the identifier for the attribute value is returned. In other embodiments, the compact function may be executed after all of the structural elements are collected.

Figure 10:
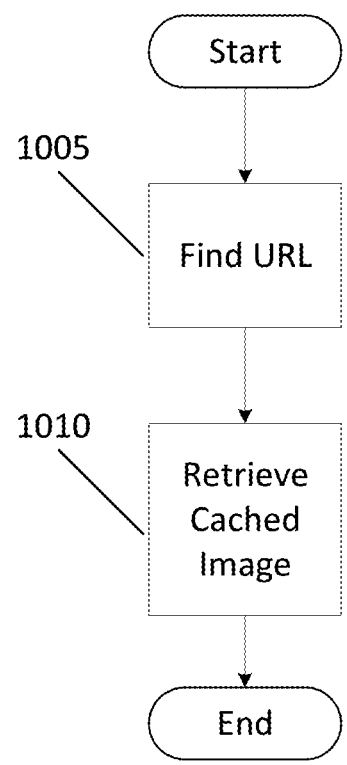
FIG. 10 is a flow diagram illustrating a process for image processing, according to an embodiment of the present invention.

The returned identifier is set in the array for the element attribute at 915. It is also determined at 920 whether the element attribute includes an image. If the element attribute includes an image, then the process of FIG. 10 is used to process the image. The prep function is executed at 925 when the timer count is the same as the timer ID. The prep function in this embodiment iterates through each page element and queues it up for processing in a way that is non-blocking and has no impact on the visitor experience. See, for example, FIG. 13.

FIG. 10 is a flow diagram 1000 illustrating a process for image processing, according to an embodiment of the present invention. It should be appreciated that the client side script embedded within the webpage of the lead generator may execute the process of FIG. 10 in some embodiments. In this embodiment, the process begins at 1005 with finding image uniform resource locators (URLs), i.e., SRC, background, etc. At 1010, for each URL, a cached image is retrieved from the web browser of the client device and the process returns to 925 of FIG. 9.

Figure 11:
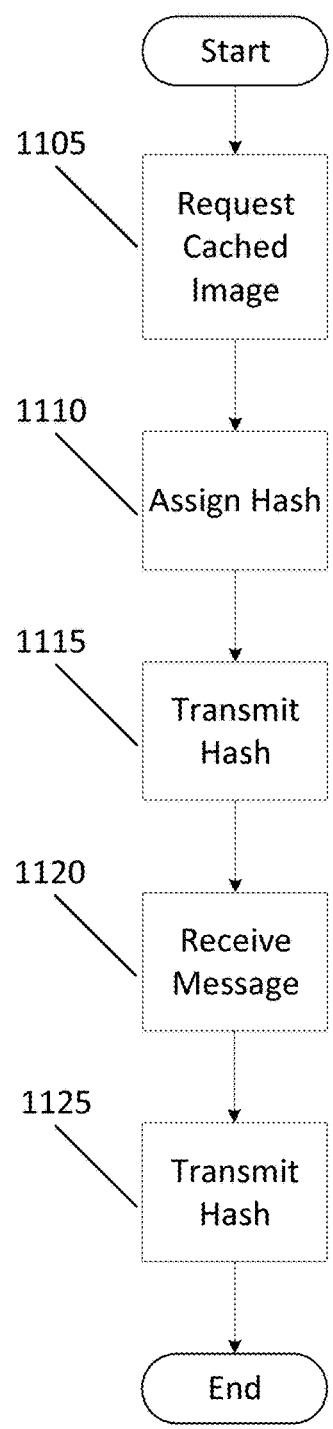
FIG. 11 is a flow diagram illustrating a process for retrieving the cached image from the web browser, according to an embodiment of the present invention.

FIG. 11 is a flow diagram 1100 illustrating a process for retrieving the cached image from the web browser, according to an embodiment of the present invention. It should be appreciated that the client-side script embedded within the webpage of the lead generator may execute the process of FIG. 11 in some embodiments. In this embodiment, the process begins at 1105 with requesting an image from the cache of the web browser, and, at 1110, a hash value (or hash image) is assigned to the image. At 1115, the hash value is transmitted to the server to determine whether the image associated with the hash value exists in the database of the server (e.g., Lead Intelligence™ or LeadiD™ server). In some embodiments, the hash value, the URL, the image, or any combination thereof may be transmitted to the server.

Figure 12:
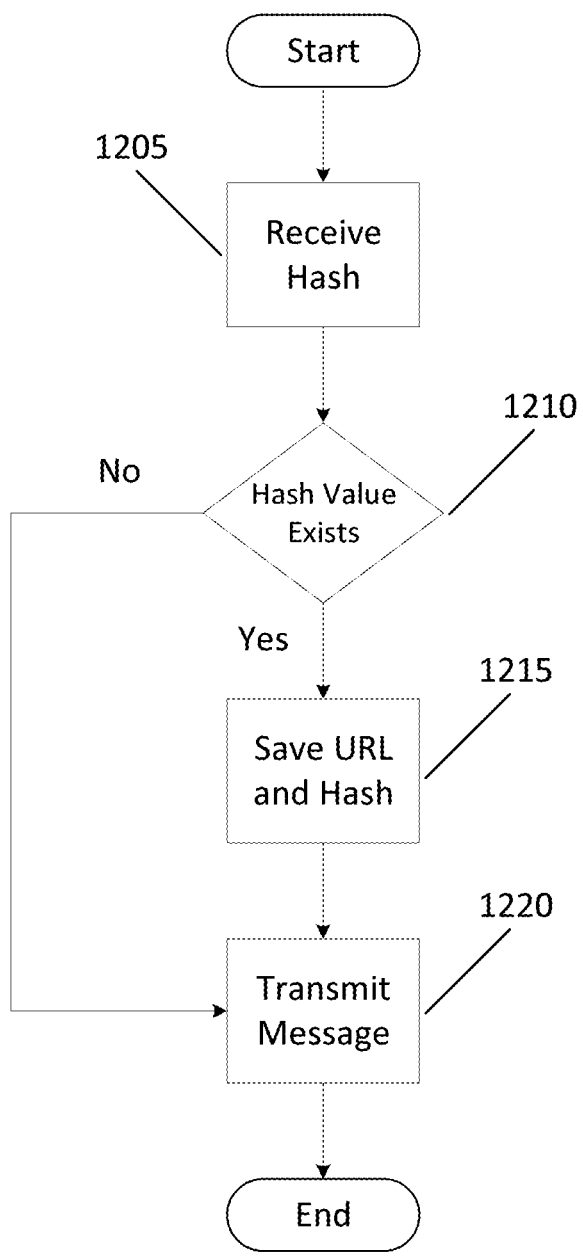
FIG. 12 is a flow diagram illustrating a process for determining whether the image retrieved from the cache exists in a database of the server, according to an embodiment of the present invention.

FIG. 12 is a flow diagram 1200 illustrating a process for determining whether the image retrieved from the cache exists in a database of the server, according to an embodiment of the present invention. It should be appreciated that the client-side script embedded within the webpage of the lead generator may execute the process of FIG. 12 in some embodiments. In this embodiment, the process begins at 1205 with the server receiving the hash value, and possibly the URL, from the client device. At 1210, the server determines whether the hash value exists in a database. If the hash value does not exist in the database, the URL and the hash value are saved in the database at 1215, and a true message is transmitted at 1220 to the client device. If the hash value exists in the database of the server, a false message is transmitted at 1220 to the client device.

Returning to FIG. 11, the message (true or false) is received at 1120 from the server, and the image, along with other information, is sent to the server at 1125, allowing the server to save the image, the URL, the hash value to the database.

Figure 13:
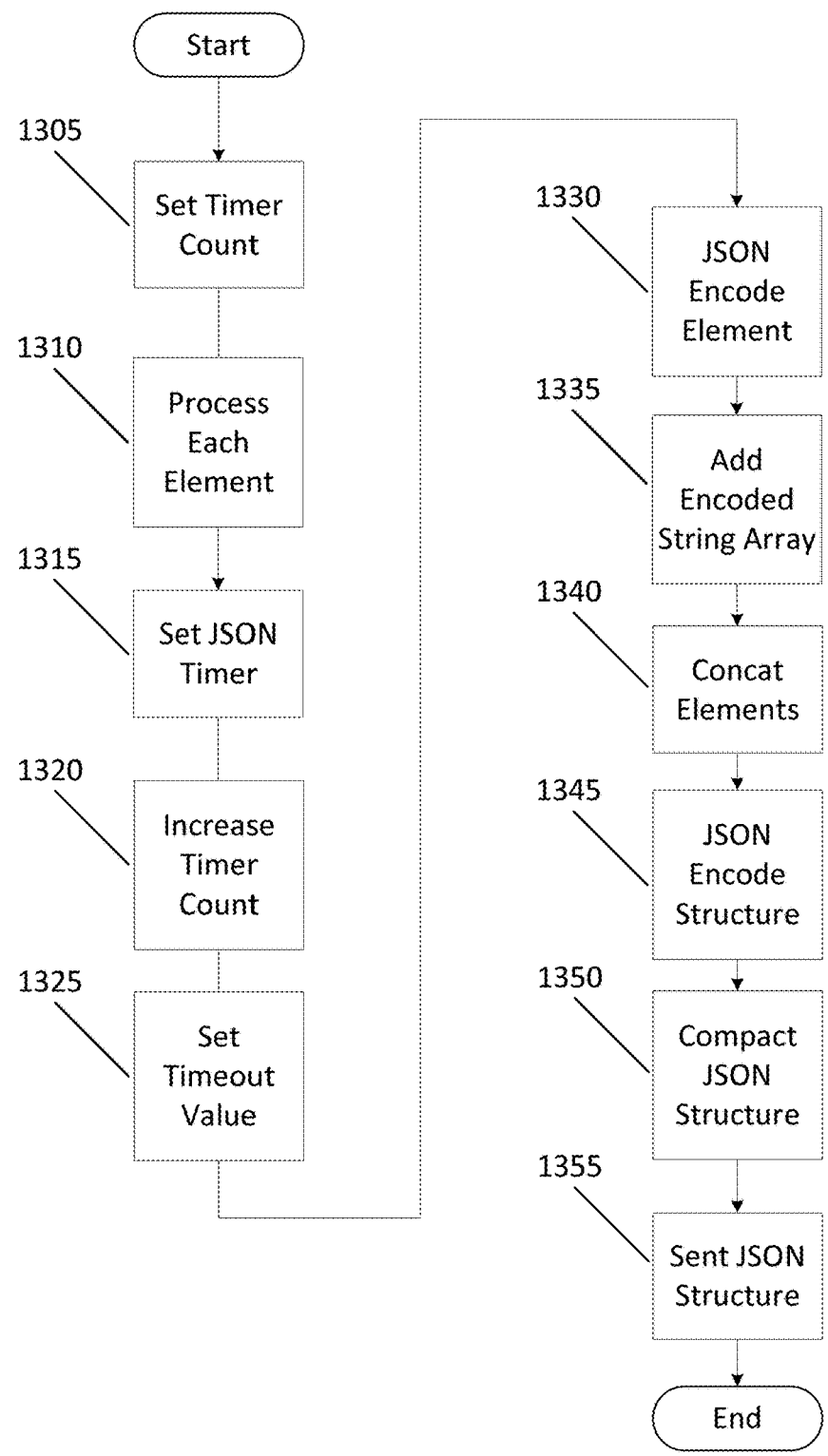
FIG. 13 is a flow diagram illustrating a process for the prep function, according to an embodiment of the present invention.

FIG. 13 is a flow diagram 1300 illustrating a process for the prep function, according to an embodiment of the present invention. It should be appreciated that the prep function and page content compaction and serialization ensures that the visitor experience is unaffected and that the minimum amount of data is transmitted to the server. It should be appreciated that the client-side script embedded within the webpage of the lead generator may execute the process of FIG. 13 in some embodiments. In this embodiment, the process begins at 1305 with setting a timer count equal to zero, and, at 1310, each element is processed with a key being greater than or equal to the value. At 1315, a JavaScript™ timer is set. At 1320, the timer count is increased and, at 1325, a timeout is set with a timeout multiplier and an offset. At 1330, using a key, which is a unique identifier to reference the element, the element is JavaScript™ Object Notation (JSON) encoded and, at 1335, an encoded element string is added to the array. When the timer count is the same as the timer ID, the elements in the array are concatenated at 1340 and the structure is JSON encoded at 1345. At 1350, the JSON encoded structure is compacted and then sent to the server at 1355.

It should be appreciated that in the process shown in FIG. 13, each element on the page is iterated through and placed into a queue to be processed in the background while the browser is not performing any other tasks. This ensures that processing occurs in the background and is completely transparent to the visitor of the webpage. In other words, the process has no discernable impact on the visitor's experience.

Further, the offset of the timeout after which the element is queued for processing is increased by a small amount, such as a number of milliseconds, after each subsequent element is iterated through. In another embodiment, a background process or processes may be employed to process page elements. This process has at least two advantage over using timeout multipliers. First, the elements can be processed as quickly as the browser permits. Second, the time required to process the page elements is not tied to the number of elements present on the page. Either method allows the elements to be processed very quickly, but not simultaneously or in a blocking manner. This ensures that the impact on the browser is minimal, since there may be a large number of elements on a page.

It should be noted that if each element is processed simultaneously or in a blocking manner, the visitor experience may be impacted adversely. At the time the element in the queue is processed, the properties of the element are compacted, serialized and associated with the element's key in the page skeleton structure. This allows and/or ensures that all of the elements on the page are collected as they were presented to the visitor and transmitted to a remote server for persistent storage.

In order to minimize the amount of data sent to server, elements that are not visible to the visitor can be ignored. For example, composite styles can be disregarded because composite styles are comprised of properties already being captured. RGB color values can be stored in their hexadecimal representation, since the latter is smaller than the former. Additionally, elements can be added to the page in order to ascertain the default values reported by the visitor's browser for particular element properties. Subsequently, these values can be used to determine the need to store an element's property. If the value of an element's property matches the default value of that element's property, then that property can be disregarded.

Figure 14:
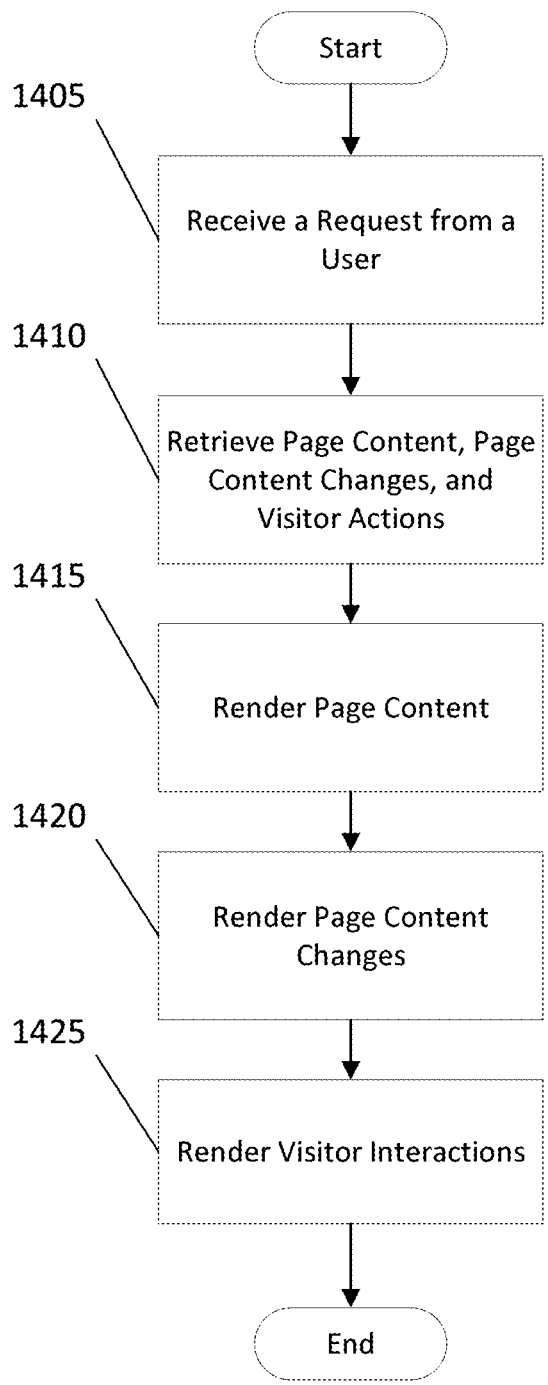
FIG. 14 is a flow diagram illustrating a process for recreating the webpage as presented to the user, according to an embodiment of the present invention.

FIG. 14 is a flow diagram illustrating a process for recreating the webpage presented to the visitor, according to an embodiment of the present invention. It should be appreciated that the client side script embedded within the lead server shown in FIG. 1 can execute the process of FIG. 14. The process begins at 1405 with the server receiving a request from a user (or lead buyer) identifying a specific event that will be simulated. At 1410, for each URL that was navigated to by the visitor (of the webpage) during the specific event, one or more of the following may be retrieved from a persistent data store: (1) the page content, (2) page content changes, and (3) visitor actions. The page content includes, but is not limited to, the page layout, text, images, position, prominence, visibility, and styling that the visitor saw. The page content changes may also include any subsequent modifications to the page content. Visitor actions may include any page the visitor navigated to, any field the visitor interacted with or changed, or any interaction through the use of a peripheral device such as a mouse, keyboard or touchscreen. It should be appreciated that the records of page content, page content changes, and visitor actions each have a timestamp.

At 1415, the page content is rendered in the user's browser as it was presented to the visitor in the event. At 1420, changes to the page content are rendered to the user at discrete points in the event timeline continuum, and at 1425, visitor interactions are rendered to the user at discrete points in the event timeline continuum.

The processes shown in FIGS. 3-14 may be performed, in part, by a computer program, encoding instructions for a nonlinear adaptive processor to cause at least the processes described in FIGS. 3-14 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 3-14, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 15:
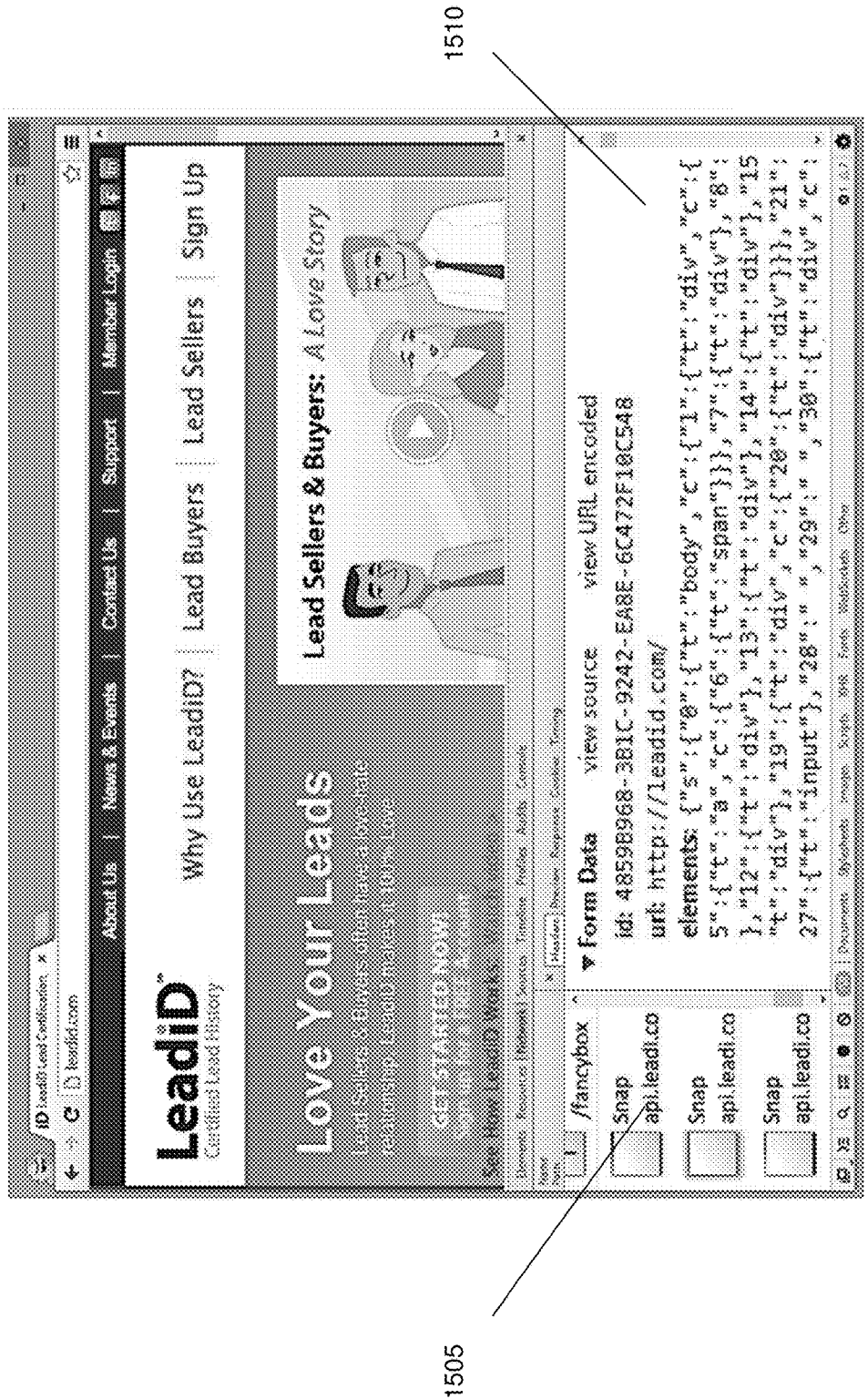
FIG. 15 illustrates a screen shot of a serialized, compacted copy of the contents of the page, according to an embodiment of the present invention.

FIG. 15 illustrates a screen shot 1500 of a serialized, compacted copy of the contents of the page, according to an embodiment of the present invention. FIG. 15 is an example of a webpage on which a script containing an embodiment of the present invention has been executed. Item 1505 identifies a number of network requests initiated by the script which are used to send event information to a remote server. Item 1510 refers to the content of one of these requests, specifically, the serialized, compacted copy of the contents of the page.

Figure 16:
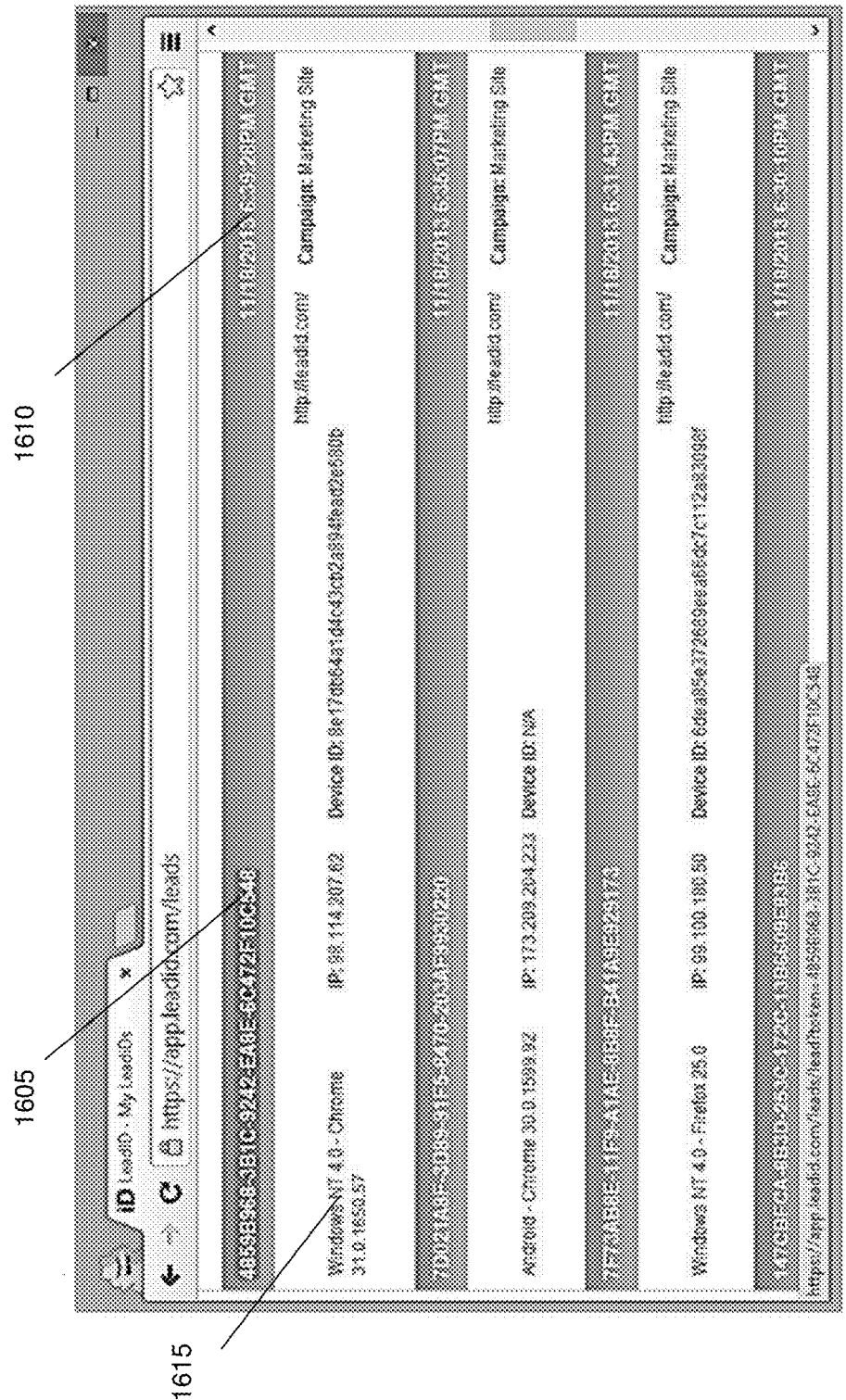
FIG. 16 illustrates a screen shot of a list of web events, according to an embodiment of the present invention.

FIG. 16 illustrates a screen shot 1600 of a list of web events, according to an embodiment of the present invention. In this embodiment, a unique identifier 1605 is displayed for each event along with a timestamp 1610 indicating when unique identifier 1605 was issued. In FIG. 16, beneath unique identifier 1605 and timestamp 1610 are details 1615 pertaining to the event, which include information about the page to which the visitor navigated, as well as information about the device, connection, and browser.

Figure 17:
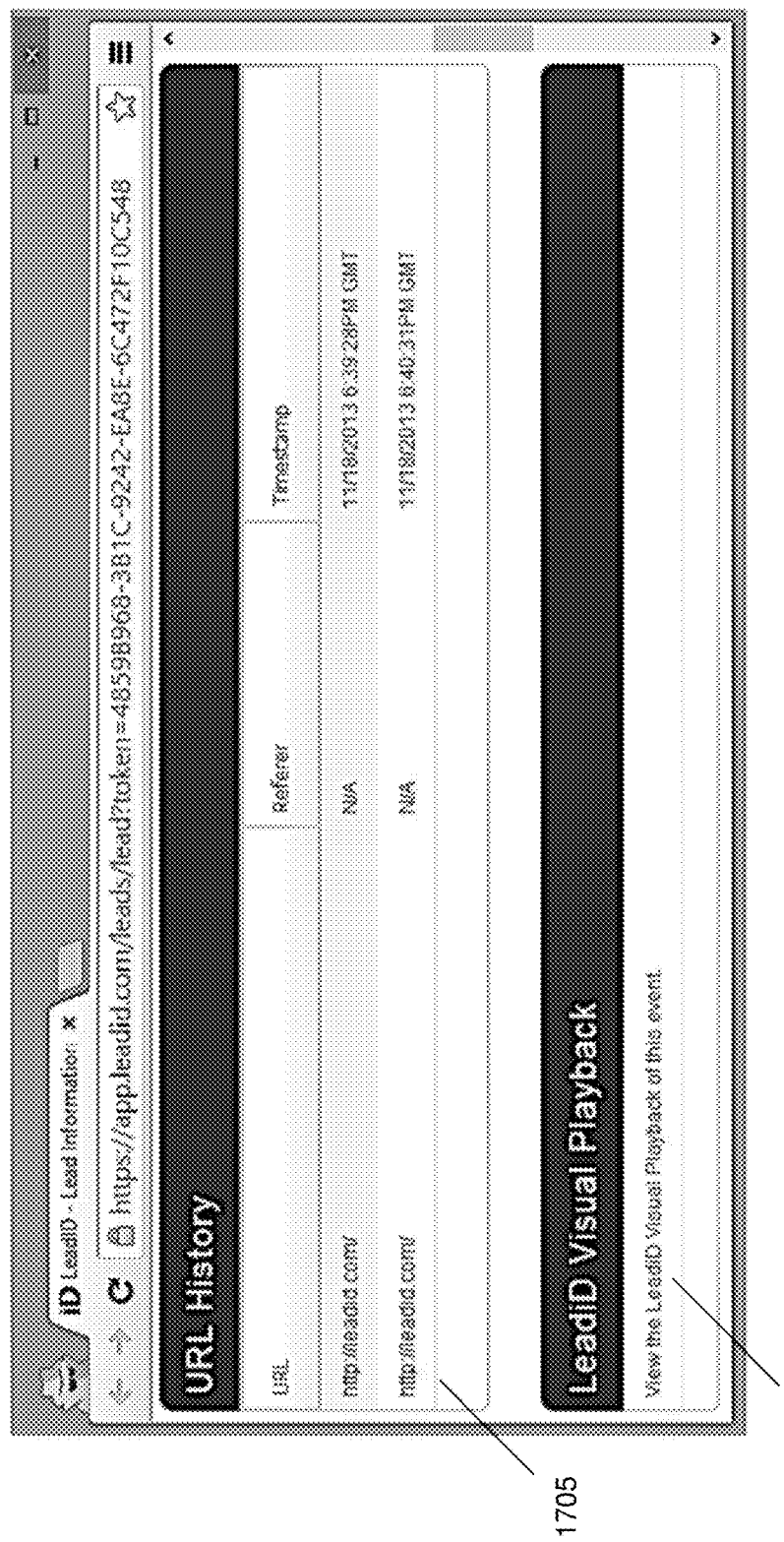
FIG. 17 illustrates a screen shot of detail from a web event, according to an embodiment of the present invention.

FIG. 17 illustrates a screen shot 1700 of detail from a web event which includes the pages to which the visitor navigated, according to an embodiment of the present invention. In this embodiment, the user (e.g., lead buyer) is presented with a URL history 1705 of the visitor's interactions with the webpage of the lead generator. In particular, URL history 1705 includes a URL and a timestamp associated with the URL. This allows the user to know the particular URL visited by the visitor along with the time the visitor visited the URL. The user is also retrieve a visual playback of the event, see item 1710.

Figure 18:
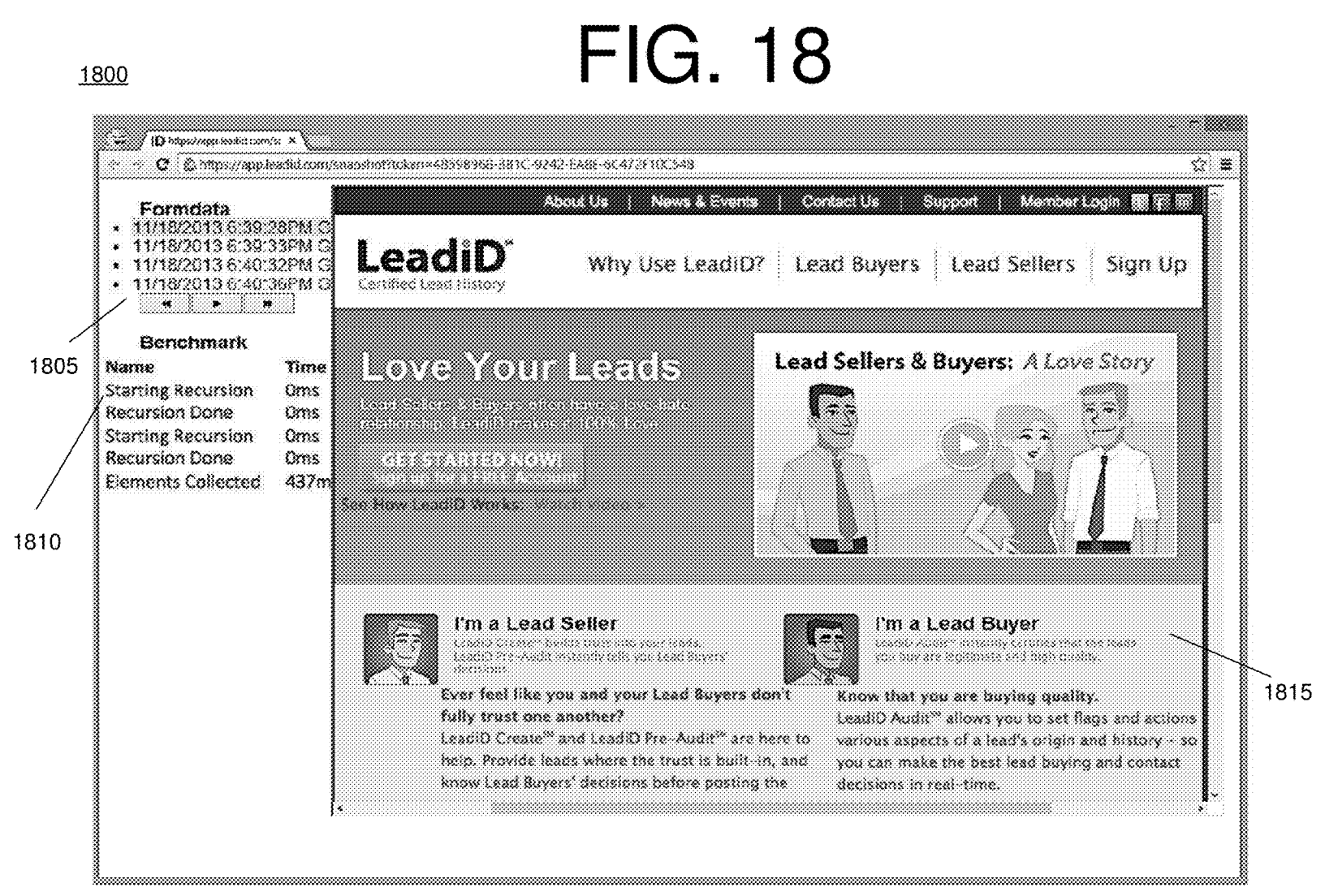

FIG. 18 illustrates a screen shot 1800 of a captured content from another webpage, according to an embodiment of the present invention. In this embodiment, the user is able to view the webpage as seen by the visitor of the webpage, see item 1815. Any changes to the webpage and/or interactions may be viewed when the user selects the play button, see item 1805. In other embodiments, the user may select the timestamp and then select play to view the visitor's interactions.

Item 1810 refers to benchmark data collected during the execution of the script pertaining to time required to perform the individual steps in the process. These measurements include the time required to iterate through all of the elements on the page, compact the elements, as well as serialize the elements.

FIG. 19 illustrates a skeleton 1900 of a capture webpage, according to an embodiment of the present invention. The skeleton structure of the page is indicated by item 1905 in which hierarchical relationships between the page's various elements are represented. In this embodiment, an element is a component of the page that can be parsed to represent that page's content. Elements may include components of a page with which a visitor may or may not be able to interact. For example, elements may include a label, textbox, dropdown list, radio button and checkboxes. The element representations here may be extremely terse but may also include unique element identifiers. Item 1910 contains positional attributes of the page elements that reference the element unique identifiers. Item 1915 includes style attributes of the page elements. An element may have multiple style attributes. For instance, style attributes are properties of the element that affect how that element is presented to the visitor. Some examples of style attributes may include an element's visibility, font size, font type, font weight, background color and foreground color. The page structure, item position and style detail can all be linked together to visually recreate the page.

Some embodiments of the present invention pertain to capturing and storing a webpage including the content that was presented to the visitor. In some embodiments, a document object of the webpage is captured. The document object may include a skeleton of the webpage that was presented to the visitor. The styling attributes may be extracted from the web browser and sent to the server, allowing for the styling attributes to be embedded within the skeleton. To ensure that the correct images are captured, image resources referenced in the web browser may be extracted and a unique identifier (or hash value) for each image may be created. A copy of the image, along with the unique identifier, may be sent from the local cache of the browser to the server. This allows for the unique identifier to be embedded within the skeleton. By capturing the skeleton of the webpage and embedding the styling attributes and image into the skeleton, the webpage as presented to the visitor can be recreated at the server for compliance verification. The process of capturing and storing the webpage may be performed at each discrete event. This allows for a replay of the webpage at each discrete event that occurred.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
memory comprising instructions; and
at least one processor, wherein
the instructions, with the at least one processor, are configured to cause the apparatus to
capture a skeleton of a webpage without collecting JavaScript, cascading style sheets, and markup language code associated with the webpage, wherein
the capturing of the skeleton comprises extracting structural data of the webpage from a document object model and collecting style information of the webpage from a web browser,
the structural data comprising one or more elements of the webpage and a hierarchical relationship between the one or more elements of the webpage; and the style information comprising layout and arrangement of the webpage; and
transmit the captured skeleton of the webpage to a server, allowing the server to recreate a webpage that was presented to a visitor, wherein
the transmission of the captured skeleton of the webpage occurs when the visitor visits the webpage, during each web event triggered by the visitor, or both, and
the instructions comprise a client-side code or script configured to cause the apparatus to collect the style information of the webpage from the web browser.

2. The apparatus of claim 1, wherein the instructions, with the at least one processor, are further configured to cause the apparatus to associate a timestamp for each web event.

3. The apparatus of claim 1, wherein the instructions, with the at least one processor, are further configured to cause the apparatus to search a cache of a web browser for the images of the webpage.

4. The apparatus of claim 3, wherein the instructions, with the at least one processor, are further configured to cause the apparatus to determine whether the images retrieved from the cache exists in a database of the server.

5. The apparatus of claim 4, wherein the instructions, with the at least one processor, are further configured to cause the apparatus to transmit the images retrieved from the cache when the images fail to exist in the database of the server.

6. The apparatus of claim 1, wherein the instructions, with the at least one processor, are further configured to cause the apparatus to capture a resource or uniform resource locator associated with at least one image of the webpage.

7. The apparatus of claim 1, wherein the instructions, with the at least one processor, are further configured to cause the apparatus to store the resource or the uniform locator in a database of a central server.

8. The apparatus of claim 1, wherein the captured skeleton comprises an element identifier for each element on the webpage, at least one position attribute for each element identifier, and at least one style attribute.

9. The apparatus of claim 1, wherein the at least one position attribute is configured to identify a position of a structural element on the webpage.

10. A computer-implemented method for recreating a webpage accessed by a user, comprising:
scanning the webpage executed by a client-side script or code when the user accesses the webpage and when content or style of the webpage changes, wherein
the scanning of the webpage comprises extracting structural information from a document object model and style information from the web browser accessed by the user without collecting JavaScript, cascading style sheets, and markup language code associated with the webpage, the style information comprising layout and arrangement of the webpage; and transmitting the extracted structural information and style information to a remote server to recreate the webpage at a later point in time.

11. The computer-implemented method of claim 10, wherein the scanning of the webpage is performed until the user leaves the webpage.

* * * * *